United States Patent Office 3,798,314
Patented Mar. 19, 1974

3,798,314
PROCESS OF MANUFACTURING ANHYDROUS MAGNESIUM CHLORIDE
Yuichi Suzukawa, Waichi Kobayashi, Kinzi Uehori, Satoshi Ohtaka, and Kozaburo Yoshida, Ube, Japan, assignors to Ube Industries, Ltd., Ube-shi, Yamaguchi-ken, Japan
No Drawing. Filed June 26, 1972, Ser. No. 266,302
Claims priority, application Japan, July 22, 1971, 46/54,195
Int. Cl. C01c 1/16; C01f 5/30
U.S. Cl. 423—498          7 Claims

ABSTRACT OF THE DISCLOSURE

High purity anhydrous magnesium chloride useful for producing metallic magnesium is manufactured by the process wherein hydrous ammonium carnallite is converted to anhydrous ammonium carnallite ammonate by contacting it with gaseous ammonia, the anhydrous ammonium carnallite ammonate is further converted to anhydrous magnesium chloride by thermally decomposing it, and the anhydrous magnesium chloride is isolated by evaporating ammonium chloride and ammonia from the decomposition product.

---

The present invention relates to a process of manufacturing anhydrous magnesium chloride of a high purity. More particularly, it relates to a process of manufacturing high purity anhydrous magnesium chloride usable as a material for producing metallic magnesium by way of molten salt electrolysis.

In the molten salt electrolytic process for the metallic magnesium, it is required that the anhydrous magnesium chloride to be converted to metallic magnesium has an excellent purity and therefore, contains substantially no impurities such as water and magnesium oxide. Generally, the anhydrous magnesium chloride to be converted to the metallic magnesium is industrially produced by the conventional processes as shown below.

(1) Thermal dehydration method wherein hydrous magnesium chloride, particularly, magnesium chloride hexahydrate, is thermally dehydrated in several stages successively.

(2) Chlorination method wherein magnesium oxide is converted to anhydrous magnesium chloride by reacting with chlorine in the presence of carbonaceous material.

The conventional methods as stated above have the following disadvantages.

(1) The reaction procedure is complicated.
(2) The resultant anhydrous magnesium chloride produced by the thermal dehydration of hydrous magnesium chloride contains a considerable amount of impurities and, therefore, is of a relatively low purity.

In order to eliminate the above-mentioned disadvantages of the conventional methods, a number of modifications are provided. For example, the hydrous magnesium chloride is thermally dehydrated by the use of an inert gas, for example, nitrogen, helium and argon; or by use of organic solvent, for example, isoamyl alcohol, n-butyl alcohol and dimethyl formaldehyde; or by the use of hydrogen chloride, potassium chloride, or ammonium chloride. However, the modified methods are not practiced due to the following drawbacks:

(1) undesirable corrosion of reaction apparatus,
(2) difficulty in recovery of the medium,
(3) complication in reaction procedure, and
(4) low purity of the resultant anhydrous magnesium chloride.

For example, U.S. Pat. No. 3,282,642 discloses a process of manufacturing anhydrous magnesium chloride wherein hydrous ammonium carnallite or a mixture of hydrous magnesium chloride with ammonium chloride is heated in a furnace in order to dehydrate the hydrous compound. The ammonium chloride is sublimated, and during or after the sublimation, an inert gas such as air or nitrogen containing 10 p.p.m. or less of water is flowed through the furnace. However, such process wherein the hydrous compound is dehydrated by the use of the inert gas includes the following disadvantages.

(1) It is very difficult to lower the water content of the inert gas to 10 p.p.m. or less.

(2) Since bound water in the hydrous ammonium carnallite or hydrous magnesium chloride is directly removed by the use of the inert gas, it is very difficult to completely prevent the hydrous compound from undesirable hydrolysis during the dehydration. Therefore, the modified method merely results in the anhydrous magnesium chloride having a purity of about 99.4% at most.

An object of the present invention is to provide a process of manufacturing anhydrous magnesium chloride of high purity by a fairly simple procedure which is relatively inexpensive.

The above stated object can be accomplished by the method of the present invention which comprises; the step of providing anhydrous ammonium carnallite ammonate by bringing hydrous ammonium carnallite into contact with gaseous ammonia; the step of thermally decomposing the anhydrous ammonium carnallite ammonate to anhydrous magnesium chloride, ammonium chloride and ammonia and; the step of isolating the anhydrous magnesium chloride by evaporating the ammonium chloride and ammonia. By the process of the present invention, not only the disadvantages of the conventional processes are eliminated but the resultant anhydrous magnesium chloride is of very high purity, i.e., substantially 100%.

In the process of the present invention, by bringing the hydrous ammonium carnallite into contact with the gaseous ammonia, the bound water in the hydrous ammonium carnallite is completely replaced by ammonia. Accordingly, the resultant ammonium carnallite ammonate contains no water. Therefore, it is obvious that the anhydrous magnesium chloride derived from the anhydrous ammonium carnallite ammonate containing no water also contains quite no water.

Further, since the contact substitutional reaction of ammonia for the bound water in the hydrous ammonium carnallite is an exothermic reaction, the temperature of the reaction system is easily maintained constant during the reaction. Therefore, the hydrous ammonium carnallite is completely prevented from undesirable hydrolysis which frequently results from non-uniform temperature distribution in the reaction system.

The hydrous ammonium carnallite usable for the process of the present invention is of the formula:

$$MgCl_2 \cdot NH_4Cl \cdot mH_2O$$

wherein $m$ is usually 6.

However, it is preferable that the ammonium carnallite hexahydrate be preliminarily dehydrated to an ammonium carnallite containing about 0.5 to about 4.0 mol of bound water. If the hydrous ammonium carnallite contains more than 4 mol of bound water, the excess bound water may produce magnesium hydroxide ($Mg(OH)_2$). This is true because a portion of the bound water may react with the ammonia so as to produce ammonium hydroxide ($NH_4OH$), and the resultant ammonium hydroxide may react with magnesium chloride so as to produce magnesium hydroxide. Also, if the hydrous ammonium carnallite is dehydrated excessively so as to reduce the content of the bound water to less than 0.5 mol, a portion of hydrous ammonium carnallite may be undesirably hydrolyzed into magnesium hydroxide during the dehydration procedure.

The preliminary dehydration of the hydrous ammonium carnallite is carried out generally at a temperature of 110 to 160° C. It is preferable that the contact substitutional reaction of hydrous ammonium carnallite with gaseous ammonia is carried out at a temperature of 200° C. or higher, more preferably, 200 to 400° C., and even more preferably, 250 to 300° C. A temperature lower than 200° C. results in too low of a reaction velocity and a temperature higher than 400° C. frequently results in undesirable hydrolysis of the hydrous ammonium carnallite.

In the contact substitutional reaction, the gaseuos ammonia is brought into contact with the hydrous ammonium carnallite in an amount sufficient to convert the hydrous ammonium carnallite to anhydrous ammonium carnallite ammonate of the formula $$MgCl_2 \cdot NH_4Cl \cdot nNH_3$$

wherein $n$ is 0.2 to 3.

The ammonium carnallite ammonate is thermally decomposed into magnesium chloride, ammonium chloride and ammonia at the temperature of the sublimation point of ammonium chloride, namely, 338° C., or higher. At this temperature, the resultant ammonium chloride and ammonia are sublimated away. Preferably, the decomposition temperature is in a range of 712 to 900° C., more preferably, 750 to 800° C. If the decomposition temperature is lower than 712° C., the produced magnesium chloride is in powder form and tends to absorb moisture from the atmosphere. If the composition temperature is higher than 900° C., a large amount of the resultant magnesium chloride is undesirably sublimated away.

In order to isolate the resultant anhydrous magnesium chloride from the decomposition product, the ammonium chloride and ammonia are evaporated during or after the thermal decomposition. The evaporated ammonium chloride and ammonia are cooled out of the decomposition system and recovered by the conventional recovery apparatus to recycle after the refining, or to utilize them in the various uses thereof.

The following examples are intended merely to illustrate the process of the present invention and not in any sense to limit the manner in which the present invention can be practiced.

EXAMPLE 1

A highly anhydrous ammonium carnallite

having the chemical composition as shown in Table 1 was heated at a temperature of approximately 150° C. for 3 hours into a lowly hydrous ammonium carnallite

having the chemical composition as shown in Table 1.

TABLE 1

| Material | Chemical composition (percent by weight) | | |
|---|---|---|---|
|  | MgCl₂ | NH₄Cl | H₂O |
| Highly hydrous ammonium carnallite | 36.8 | 20.2 | 43.0 |
| Lowly hydrous ammonium carnallite | 45.2 | 25.2 | 29.6 |

A transparent reaction tube made of a quartz glass and having an inside diameter of 28 mm. and a length of 500 mm. was placed in a vertical tube type electric furnace and charged with 20 g. of the lowly hydrous ammonium carnallite. The reaction tube was heated at a temperature of approximately 300° C. for an hour while flowing gaseous ammonia containing 0.5% by weight of water into the reaction tube through the bottom end thereof, at a flow rate of 1.5 litre/min., so as to go into contact substitutional reaction with the lowly hydrous ammonium carnallite.

By this reaction, the lowly hydrous ammonium carnallite was converted to anhydrous ammonium carnallite ammonate. The resultant anhydrous ammonium carnallite ammonate was charged into a transparent quartz glass test tube, and the test tube was heated at a temperature of 800° C. in an electric crucible furnace. During the heating the anhydrous ammonium carnallite ammonate was thermally decomposed to anhydrous magnesium chloride, ammonium chloride and ammonia, and the ammonium chloride and ammonia were evaporated from the decomposition product. The remainder in the test tube was high purity anhydrous magnesium chloride having the chemical composition shown in Table 2 in an amount of 9 g.

COMPARISON EXAMPLE 1

The same reaction tube as that of Example 1 was charged with the same lowly hydrous ammonium carnallite of 20 g. as that shown in Table 1. The charged hydrous ammonium carnallite was thermally dehydrated at a temperature of approximately 300° C. for an hour while flowing high purity helium containing at most 5 p.p.m. of water into the reaction tube at a flow rate of 1.5 litre/min. (superficial velocity in a column of 244 cm./sec.). From the dehydration product, the produced ammonium chloride was evaporated in the same method as in Example 1. The remainder in the reaction tube was anhydrous magnesium chloride having the chemical composition shown in Table 2 in an amount of 9 g.

COMPARISON EXAMPLE 2

The same procedure as that of Comparison Example 1 was repeated except that the dehydration was effected using a vacuum pump instead of the flowing of helium. The resultant anhydrous magnesium chloride had the composition shown in Table 2 in an amount of 9 g.

EXAMPLE 2

The same procedure as that of Example 1 was repeated except that the contact substitutional reaction was carried out at a temperature of 250° C. The resultant anhydrous magnesium chloride had the composition shown in Table 2 in an amount of 9 g.

EXAMPLE 3

The same procedure as that of Example 1 was repeated except that the temperature of the contact substitutional reaction was 350° C. The resultant anhydrous magnesium chloride had the chemical composition shown in Table 2 in an amount of 9 g.

EXAMPLE 4

A reaction tube made of an opaque quartz glass and having an inside diameter of 100 mm. and a length of 1,000 mm. was placed in a vertical tube type electric furnace and charged with 800 g. of the same lowly hydrous ammonium carnallite as that shown in Table 1. The reaction tube was heated at a temperature of approximately 300° C. for 3 hours while flowing gaseous ammonia containing 0.5% by weight of water into the reaction tube at a flow rate of 15 litre/min., so as to go into a contact substitutional reaction with the lowly hydrous ammonium carnallite. The resultant anhydrous ammonium carnallite ammonate was charged into an alumina crucible located in an electric crucible furnace, and thermally decomposed at a temperature of 800° C. The produced ammonium chloride and ammonia were evaporated and the remainder in the crucible was 360 g. of high purity anhydrous magnesium chloride having a composition as shown in Table 2.

In the above process, the excess of gaseous ammonia fed into the reaction tube was recovered at a recovery efficiency of 98% by absorbing it in water within an absorbing column connected directly to the reaction tube. Also, ammonium chloride and ammonia derived from the thermal decomposition of anhydrous ammonium carnallite ammonate were recovered at recovery efficiencies of ammonium chloride 99%, and of ammonia 98%, by absorbing them in water within an absorbing column directly connected to the electric crucible furnace.

TABLE 2

| | Chemical composition (percent by weight) | | |
|---|---|---|---|
| | $MgCl_2$ | MgO | Other impurities |
| Example: | | | |
| 1 | 99.82 | 0.14 | 0.04 |
| 2 | 99.82 | 0.13 | 0.05 |
| 3 | 99.80 | 0.15 | 0.05 |
| 4 | 99.83 | 0.14 | 0.03 |
| Comparison Example: | | | |
| 1 | 99.10 | 0.85 | 0.05 |
| 2 | 96.36 | 3.60 | 0.04 |

As Table 2 clearly illustrates, the anhydrous magnesium chloride obtained in Examples 1 to 4 according to the process of the present invention had a very high purity of $MgCl_2$ and a very low content of MgO. But in Comparison Examples 1 and 2, the purity of the $MgCl_2$ in the resultant products was lower than those of Examples 1 to 4. This was particularly so in the product of Comparison Example 2, wherein the vacuum pump was used, which had a high content of MgO.

From the above examples, it is obvious that the process of the present invention is very valuable for producing high purity anhydrous magnesium chloride.

What we claim is:

1. A process of manufacturing anhydrous magnesium chloride of a high purity, comprising preliminarily dehydrating a highly hydrated ammonium carnallite to provide a lesser hydrated ammonium carnallite of the formula:

$$MgCl_2 \cdot NH_4Cl \cdot mH_2O$$

wherein $m$ is 0.5 to 4.0, contacting said lesser hydrated ammonium carnallite with gaseous ammonia at a temperature of at least 200° C. to provide an anhydrous ammonium carnallite ammonate of the formula:

$$MgCl_2 \cdot NH_4Cl \cdot nNH_3$$

wherein $n$ is 0.2 to 3, thermally decomposing said anhydrous ammonium carnallite ammonate at a temperature of at least 338° C. to provide anhydrous magnesium chloride, ammonium chloride and ammonia, and isolating said anhydrous magnesium chloride by evaporating the ammonium chloride and ammonia.

2. A process as claimed in claim 1, wherein the preliminary dehydration in part is effected by heating the hydrated ammonium carnallite at a temperature of 110 to 160° C.

3. A process as claimed in claim 1, wherein the gaseous ammonia is brought into contact with the hydrated ammonium carnallite at a temperature of 200 to 400° C.

4. A process as claimed in claim 3, wherein the contacting temperature is 250 to 300° C.

5. A process as claimed in claim 1, wherein the thermal decomposition temperature is 712 to 900° C.

6. A process as claimed in claim 1, wherein the thermal decomposition temperature is 750 to 800° C.

7. A process as claimed in claim 1, wherein the evaporated ammonium chloride and ammonia are recovered.

References Cited

UNITED STATES PATENTS

| 1,276,499 | 8/1918 | Dantsizen | 423—498 |
| 2,165,284 | 7/1939 | Madorsky | 423—498 X |
| 3,347,625 | 10/1967 | Kimberlin, Jr. et al. | 423—498 |
| 3,387,920 | 6/1968 | Nightingale, Jr. | 423—498 |
| 3,647,367 | 3/1972 | Macey | 423—498 X |

FOREIGN PATENTS

| 1,033,173 | 6/1966 | Great Britain | 423—498 |
| 1,092,710 | 11/1967 | Great Britain | 423—498 |
| 1,183,485 | 12/1964 | Germany | 423—498 |

EDWARD STERN, Primary Examiner

U.S. Cl. X.R.

423—351, 356, 413, 470, 471

UNITED STATES PATENT OFFICE
CERTIFICATE OF CORRECTION

Patent No. 3,798,314  Dated March 19, 1974

Inventor(s) Yuichi Suzukawa, et al

It is certified that error appears in the above-identified patent and that said Letters Patent are hereby corrected as shown below:

Column 1, line 62: "dimethyl formaldehyde" should be

--dimethyl formamide--

Column 3, line 34 : "composition" should be --decomposition-- line 51 : "anhydrous" should be --hydrous--

Signed and sealed this 26th day of November 1974.

(SEAL)
Attest:

McCOY M. GIBSON JR.
Attesting Officer

C. MARSHALL DANN
Commissioner of Patents